United States Patent [19]

Sheriff

[11] Patent Number: 4,649,445

[45] Date of Patent: Mar. 10, 1987

[54] FLOATING COLLET SUSPENSION FOR FLOPPY DISK DRIVES

[75] Inventor: David R. Sheriff, Campbell, Calif.

[73] Assignee: Xerox Corporation, Stamford, Conn.

[21] Appl. No.: 605,521

[22] Filed: Apr. 30, 1984

[51] Int. Cl.⁴ .......................................... G11B 5/016
[52] U.S. Cl. ...................................... 360/99; 369/270
[58] Field of Search .................... 360/97–99; 369/270–271

[56] References Cited

U.S. PATENT DOCUMENTS

| | | | |
|---|---|---|---|
| 4,125,883 | 11/1978 | Rolph | 360/99 |
| 4,151,573 | 4/1979 | Tandon et al. | 360/104 |
| 4,171,531 | 10/1979 | Grapes et al. | 360/99 |
| 4,193,101 | 3/1980 | Carlson et al. | 360/97 |
| 4,224,648 | 9/1980 | Roling | 360/97 |
| 4,306,258 | 12/1981 | Higashiyama et al. | 360/99 |
| 4,328,521 | 5/1982 | Pexton et al. | 360/104 |
| 4,339,778 | 7/1982 | Wise | 360/99 |
| 4,391,543 | 7/1983 | Elsing | 403/24 |
| 4,409,629 | 10/1983 | Puls | 360/99 |
| 4,413,294 | 11/1983 | Beijes | 360/99 |
| 4,430,678 | 2/1984 | Hack et al. | 360/99 |

OTHER PUBLICATIONS

IBM T.D.B., vol. 21, No. 1, Jun. 1978, pp. 291–292; Holecek; Loading Collet for Flexible Magnetic Disks.
IBM T.D.B., vol. 20, No. 6, Nov. 1977, pp. 2376–2377; Beuch; Spider Collet for Flexible Magnetic Disks.

*Primary Examiner*—A. J. Heinz

[57] ABSTRACT

A collet for clamping recording media to the spindle of a floppy disk drive has a ball joint-type suspension, such as may be provided by having the collet ride on a hemispherical bearing, whereby the center of action of the media clamping forces supplied by the collet remains substantially centered on the spindle, even if the spindle and/or the collet lack perfect dynamic symmetry or concentricity.

5 Claims, 4 Drawing Figures

FLOATING COLLET SUSPENSION FOR FLOPPY DISK DRIVES

FIELD OF THE INVENTION

This invention relates to the media/spindle interface of floppy disk drives and, more particularly, to a gimbal-like suspension for the collet of such a disk drive, whereby the collet is free to follow any dynamic perturbations in the spindle rotation and the spindle velocity is essentially unaffected by any assymetry of the collet. Specifically, the suspension provided by this invention suppresses unwanted, orbital clamping forces.

BACKGROUND OF THE INVENTION

Rotating magnetic memories are becoming increasingly sophisticated to accomodate the growing need for reliable data storage and retrieval. So-called flexible or "floppy" disk drives are still in great demand, but there is mounting pressure to improve their performance and reliability while reducing their manufacturing cost.

As is known, floppy disk drives employ a disk-shaped, centrally apertured, compliant magnetic recording medium which conventionally is housed for rotation within a protective envelope or jacket, so that there is minimal direct contact with the recording medium as it is being inserted into and removed from the disk drive or otherwise being handled. The jacket, in turn, has several strategically located openings for exposing the recording medium, including a centrally located aperture so that the recording medium or "disk" can be centered on and clamped to a rotably driven spindle, and at least one radially elongated slot to enable a recording head to access the disk for writing data on and reading data from anyone of a plurality of concentric tracks.

Substantial effort and expense have been devoted to designing media centering and clamping mechanisms for floppy disk drives. High performance floppy disk drives require precise centering of the recording medium with respect to the spindle to avoid unacceptable "off-track errors" and positive, non-slip clamping of the recording medium to the spindle to avoid unacceptable "bit time displacement errors" while data is being stored (i.e., "written") or retrieved (i.e., "read"). Furthermore, the disk centering and clamping action need not only be repeatable by a single disk drive, but also replicatable by other disk drives because data recorded by one disk drive is often read out by another. Indeed, one of the basic advantages of floppy disk drives is that the recording medium is removeable, whereby data may be easily "transported" from one drive to another.

Expandible collet-type disk centering and clamping mechanisms have been especially well received and are widely utilized in modern floppy disk drives. They characteristically require that the spindle have a central cylinderical bore or recess for receiving a positioning cone or collet having a generally circular array of flexible fingers. In operation, the fingers radially expand against the inner edge of the central aperture in the recording medium while the collet is being seated within the spindle bore, thereby centering the recording medium or disk on the spindle. Examples of this type of clamping mechanism can be found in U.S. Pat. Nos. 4,125,883, 4,193,101, 4,409,629, 4,413,294 and 4,430,678. Typically, the collet is plastic and is designed so that its fingers resiliently deform whenever any force great enough to cause unwanted crimping or bending of the recording medium is applied thereto, thereby protecting the recording medium from being damaged. Furthermore, provision is usually made to ensure that little, if any, clamping pressure is applied to the recording medium until it is centered on the spindle. To that end, the clamping pressure conventionally is furnished by flanges which extend outwardly from the fingers of the collet to clamp the recording medium against an annular rim or face of the spindle only when the collet is substantially fully seated within the spindle bore.

The disk centering action of these expandible collet-type mechanisms usually is quite precise and readily repeatable. Unfortunately, however, their clamping action tends to be very sensitive to any dynamic assymetry of the spindle or collet, such as may be caused by the acceptable manufacturing tolerances for those parts. Specifically, such assymetry leads to an "off-center clamping force" which may causing intermittent slip of the media as it orbits around the spindle/media interface. U.S. Pat. No. 4,413,294 proposes a gimbal suspension for the collet of such a disk drive, but that proposal is not a full and satisfactory solution to the problem because the suspension suggested by that patent is relatively complex, costly and difficult to manufacture.

SUMMARY OF THE INVENTION

In accordance with the present invention, a collet for clamping recording media to the spindle of a floppy disk drive has a ball joint-type suspension, such as may be provided by having the collet ride on a hemispherical bearing, whereby the center of action of the media clamping forces supplied by the collet remains accurately centered on and positively clamped to the spindle, even if the spindle and/or the collet lack perfect concentricity and dynamic symmetry.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with reference to a particular embodiment, it is to be understood that there is no intent to limit it to that embodiment. On the contrary, the aim is to cover all modifications, alternatives and equivalents falling within the spirit and scope of the invention as defined by the appended claims.

Figure 1:
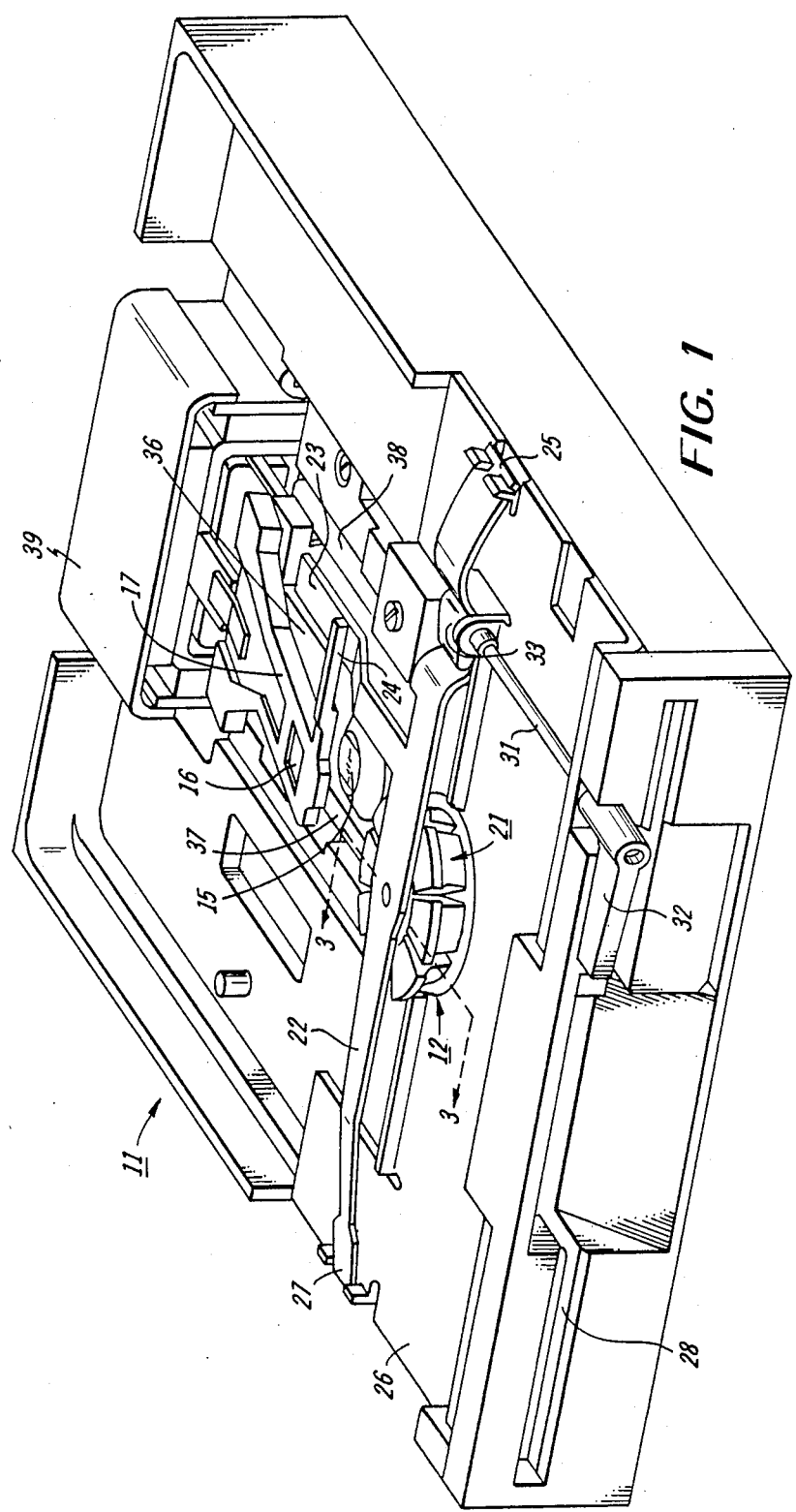
FIG. 1 is a simplified perspective view of a typical floppy disk drive having a collet suspension constructed in accordance with the present invention.

Turning now to the drawings, and at this point especially to FIG. 1, there is a floppy disk drive 11 (shown only in relevant part) having an expandible collet-type disk centering and clamping mechanism 12 for concentrically positioning and clamping a compliant magnetic recording medium 13 on a rotatably driven spindle 14 (see FIG. 2), thereby causing the recording medium 13 to rotate while data is being written thereon or read therefrom by either one of a pair of opposed magnetic recording heads 15 and 16. While the line of sight to the moveable side-1 head 16 is somewhat obstructed, it will be understood that the head 16 is mounted on a pivotally supported load arm 17 for swinging movement toward and away from the fixed side-0 head 15, so that data may be written on and read from either side of the recording medium 13. See, for example, U.S. Pat. No. 4,151,573, which issued Apr. 24, 1979 on a "Magnetic Recording Device for Double Sided Media." Furthermore, even though a double sided disk drive is shown, it will be evident that the present invention is equally applicable to single sided drives.

In keeping with accepted practices, the recording medium 13 is inserted into and removed from the disk drive 11 while the disk centering and clamping mechanism 12 is disengaged and while the heads 15 and 16 are unloaded. To that end, the collet 21 of the disk centering and clamping mechanism 12 is suspended from a bowed leaf spring 22, and a lifter arm 23 projects from the leaf spring 22 into underlying relationship with a tab 24 which extends from the head load arm 17. The leaf spring 22 has one end pivotably mounted, as at 25, on the housing 26 of the disk drive 11 and its opposite end guided, as at 27, for sliding movement relative to the housing 26. In the absence of any external force, the bow of the leaf spring 22 is sufficient to fully disengage the collet 21 from the spindle 14 (FIG. 2) and to lift the load arm 17 so that the moveable head 16 is spaced apart from the fixed head 15. Thus, the recording medium 13 (FIG. 2) may be inserted into and removed from the drive 11 via a conventional media access slot 28, without encountering any significant interference by the spindle 14, the collet 21, or the heads 15 and 16.

To enable the user to engage the clamping mechanism 12 and load the heads 15 and 16 or to disengage the clamping mechanism 12 and unload the heads 15 and 16, there is a connecting rod 31 for coupling a manually operated lever 32 to an eccentric 33 which bears against the leaf spring 22. When the lever 31 is positioned as shown, the eccentric 33 applies relatively little force to the spring 22, so that the recording medium 13 then may be inserted or removed from the drive 11 as previously described. However, when the lever 33 is rotated approximately a quarter turn in a counterclockwise direction, the eccentric 31 rotates a like amount such that it then supplies sufficient force to counteract the bow of the leaf spring 22, thereby supplying a generally axial load force for loading the collet 21 against the spindle 14, while allowing the heads 15 and 16 to load into data transferring relationship with the recording medium 13. See, U.S. Pat. No. 4,193,101, which issued Mar. 11, 1980 on a "Collet Loading Mechanism" embodying similar principles.

Another more or less conventional feature of the disk drive 11 is that the heads 15 and 16 are supported on a carriage 36 which is mounted for sliding movement on a pair of generally parallel guide rods 37 and 38, so that a suitable actuator, such as a linear voice coil motor 39, may move the carriage 16 forward and back on the guide rods 37 and 38 as required to radially align the heads 15 or 16 with any selected one of a plurality of concentric tracks on side-0 or side-1, respectively of the recording medium 13. Typically, the clamping mechanism 12 is engaged and the heads 15 and 16 are loaded against the recording medium 13 before the actuator 39 is energized to execute any such "seek command."

Figure 2:
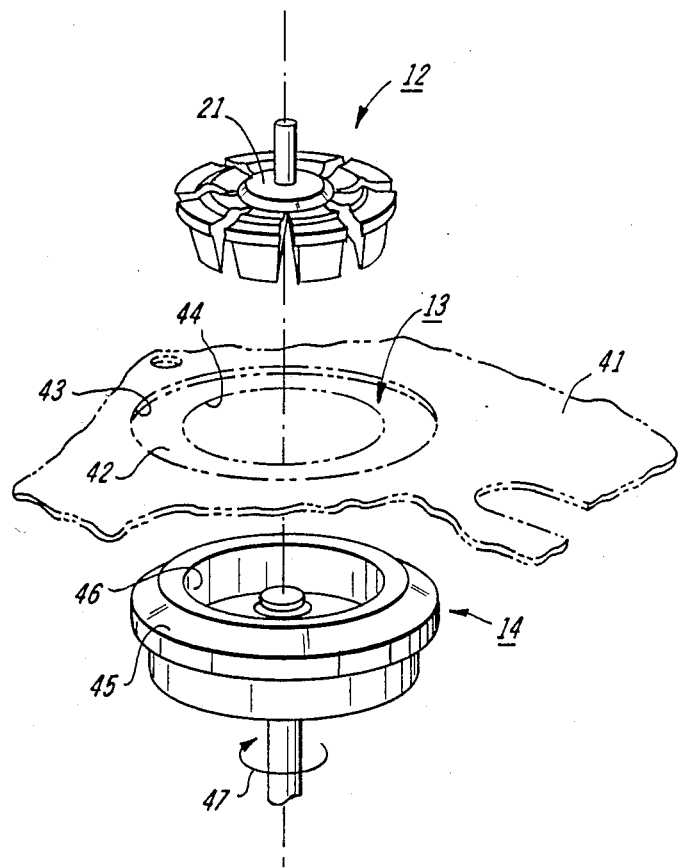
FIG. 2 is an enlarged, fragmentary perspective view which schematically illustrates the collet and spindle of the disk drive in additional detail.

As shown in some additional detail in FIG. 2, the recording medium 13 is roughly aligned (by means not shown) while being inserted into the disk drive 11 (FIG. 1) so that it is positioned, as shown in phantom lines, to be sequentially centered on and clamped to the the spindle 14 while the collet 21 is being "loaded" (i.e., brought into engagement with the spindle 14). In keeping wih standard practices, the recording medium 13 is a centrally apertured, compliant disk which is housed for rotation within a centrally apertured protective envelope 41. An inner annular segment 42 of the recording medium or disk 13 is exposed because the central aperture 43 of the envelope 41 has a somewhat larger diameter than the central aperture 44 of the disk 13. The spindle 14, in turn, has an annular rim 45 surrounding a carefully machined or otherwise precisely dimensioned central bore 46 having a diameter which is essentially equal to the diameter of the disk aperture 44, whereby the exposed disk segment 42 aligns with the spindle rim 45 when the disk 13 is properly centered on the spindle 14 as subsequently described. While data is being written on or read from the disk 13, the spindle 14 is rotated (by means not shown) at a predetermined, constant velocity, such as 360 rpm, in the direction of the arrow 47.

Figure 3:
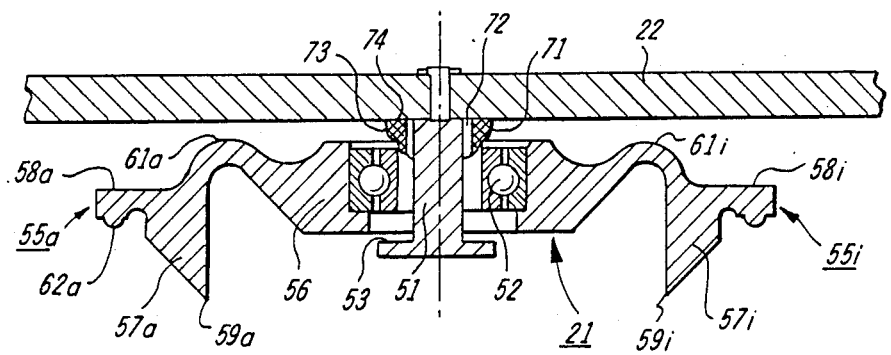
FIG. 3 is an enlarged, fragmentary sectional view taken along the line 3—3 in FIG. 1 to illustrate the collet suspension provided by this invention.

Referring to FIG. 3, it will be seen that the collet 21 is suspended from the leaf spring 22 on a central support shaft 51 and is journalled for rotation about the shaft 51 by an annular ball bearing 52. There is a radial clearance between the support shaft 51 and the bearing 52, so that the collet 21 may shift radially with respect to the shaft 51 as required to concentrically align with the spindle 14. Thus, the free end of the support shaft 51 is terminated by a relatively large diameter flange 53 to retain the collet 21.

Figure 4:
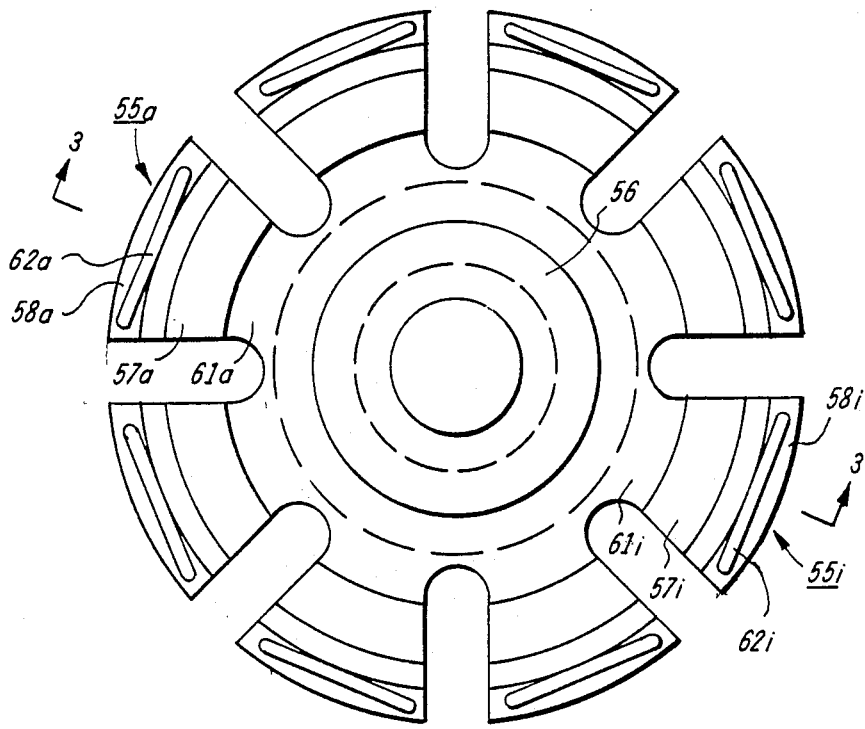
FIG. 4 is an enlarged plan view of spindle/media interface provided by the collet.

As best shown in FIGS. 3 and 4, the collet 21 conventionally has an inverted cup-like configuration and is segmented at regular angular intervals so that it has a plurality of flexible fingers $55a-55i$ extending radially from its base 56. For centering a disk 13 on the spindle 14, there are wedge-shaped legs $57a-57i$ extending axially from the fingers $55a-55i$, respectively. Furthermore, for clamping the centered disk 13 to the spindle 14, there are radially extending flanges $58a-58i$ at the outer tips of the fingers $55a-55i$, respectively, for distributing the load force supplied by the load spring 22 circumferentially of the spindle 14.

When the fingers $55a-55i$ are relaxed, the tips $59a-59i$ of the legs $57a-57i$ lie on a circle which has a substantially smaller diameter than the central aperture 44 of the disk 13. Thus, as can be visualized by referring to FIG. 2, they more or less freely pass through the disk aperture 44 and into the central bore 46 of the spindle 14. The wedging action of the legs $57a-57i$ gently and progressively centers the disk 13 as the collet 21 is being seated on the spindle 14, even before the fingers $55a-55i$ start to radially expand.

More particularly, as illustrated, the fingers $55a-55i$ have relatively thin, arcuately buckled segments $61a-61i$ inboard of the legs $57a-57i$, respectively, which resiliently deform when the disk centering legs $57a-58i$ and/or the clamping flanges $58a-58i$ make contact with the spindle 14, thereby causing the fingers $55a-55i$ to radially expand so that the disk 13 is precisely centered on the spindle 14. Of course, no substantial clamping pressure is applied to the disk 13 until the fingers 55a–55i have expanded sufficiently to seat the legs 57a–57i firmly against the sidewall of the spindle bore 46 because the deformable segments 61a–61i continue to yield in the absence of such resistance to further radial expansion of the fingers 55a–55i.

As described in more detail in a copending and commonly assigned U.S. patent application of David R. Sheriff on a "Self-Compensating Media Centering and Clamping Mechanism for Floppy Disk Drives", which was filed Apr. 30, 1984 under Ser. No. 605,328, there are generally tangentially extending, arcuately profiled ribs 62a–62i on the flanges 58a–58i, respectively, for clamping the disk 13 (FIG. 2) to the spindle 14. After the disk 13 has been properly centered on the spindle 14, the ribs 62a–62i urge the exposed inner annular segment 42 of the disk 13 into pressure contact with the annular rim 45 of the spindle 14, thereby causing the disk 13 to rotate with the spindle 14. Due to the flexibility of the fingers 55a–55i there is an effective line contact between the ribs 62a–62i and the disk 13 while the collet 21 is fully seated on the spindle 14, even if the axes of the spindle 14 and collet 21 are not absolutely collinear or if the clamping flanges 58a–58i and the spindle rim 45 are not perfectly flat and parallel. That ensures that the clamping pressure applied to the disk 13 is substantially independent of the usual manufacturing tolerances. Preferably, the ribs 62a–62i are profiled to have a substantially constant radius so that the contact area between the ribs 62a–62i and the disk 13 is essentially unaffected by the flexing of the fingers 55a–55i. That, of course, minimizes the variations in the clamping pressure applied by the ribs 62a–62i, whereby the clamping pressure may be preselected as required for optimum non-slip clamping of the disk 13 to the spindle 14.

In accordance with the present invention, there is a ball joint-type suspension for the collet 21 so that the center of action of the media clamping force applied by the collet remains substantially centered on the spindle 14, despite the inherent dynamic perturbations in the rotation of the spindle 14, such as may be caused by its radial or axial runout variations, and any dynamic asymetry of the collet, such as may be caused by the tolerances required for low cost, mass production. To that end, as illustrated in FIG. 3, there is a hemispherical sleeve bearing 71 mounted on the collet support shaft 51 between the collet 21 and the load spring 22. A suitable radial clearance is provided between the central bore or sleeve 72 of the bearing 71 and the shaft 51, so that the bearing 71 may shift radially with respect to the shaft 51 while the collet 21 is centering itself on the spindle 14 (FIG. 2).

When the collet 21 is loaded against or engaged with the spindle 14, the load spring 22 engages the planar base 74 of the bearing 71, thereby urging its hemispherical bearing surface 73 into contact with the adjacent inner shoulder of the collet journal bearing 52 and causing the collet 21 to apply a generally axial load force to the spindle 14. Typically, the shoulder of the journal bearing 52 is chamfered, so that there is relatively little binding between the bearings 52 and 71. In other words, the bearing 71 forms a ball joint which allows the collet 22 to follow the dynamic perturbations of the spindle 14 with little, if any, resistance.

CONCLUSION

In view of the foregoing, it will now be understood that the collet suspension provided by the present invention stabilizes the center of action of the media clamping forces supplied by the collet substantially on the center of the spindle, thereby reducing the risk of the media slipping relative to the spindle. Moreover, it will be evident that the suspension is economical and easily assembled.

What is claimed is:

1. In a floppy disk drive having a rotatably driven spindle, a collet, load means for applying a generally axial load force to said collet for clamping recording media to said spindle, and a support shaft for suspending said collet from said load means; said collet being journalled for rotation on said support shaft, and said load force being distributed by said collet about a center of action; the improvement comprising
   a ball joint disposed between said load means and said collet for enabling said collet to follow any dynamic perturbations in the rotation of said spindle, said shaft extending in opposite directions from said ball joint axially of said shaft, and said ball joint including a single hemispherical bearing having a generally planar base oriented to engage said load means and a generally hemispherical bearing surface oriented to engage said collet, whereby said collet rides on said hemispherical bearing surface while following the dynamic perturbations of said spindle, thereby dynamically stabilizing the center of action of said load force with respect to said spindle.

2. The improvement of claim 1 further including
   an annular bearing for journalling said collet for rotation on said support shaft; and wherein
   said hemispherical bearing is a sleeve bearing and is supported on said shaft between said load means and said annular bearing, and
   said hemispherical bearing and said annular bearing have radial clearances from said shaft, whereby said collet may be shifted radially with respect to said shaft to align with said spindle.

3. The improvement of claim 1 wherein
   said collet distributes said load forces circumferentially of said spindle such that the center of action of said load forces is substantially centered on said spindle.

4. The improvement of claim 3 wherein
   said collet is self-centering with respect to said spindle and comprises a plurality of radially extending flexible fingers which are located at regular angular intervals to distribute said load forces circumferentially of said spindle.

5. The improvement of claim 4 further including
   an annular bearing secured to said collet for journalling said collet for rotation on said support shaft; and wherein
   said hemispherical bearing is mounted on said support shaft between said load means and said collet,
   said hemispherical bearing and said annular bearing have radial clearances from said support shaft, whereby the collet may shift radially with respect to said shaft while centering on said spindle, said annular bearing has a chamfered inner shoulder which engages with said hemispherical bearing surface when said collet is loaded against said spindle, thereby enabling said collet to follow the dynamic perturbations of said spindle with relatively little resistance.

* * * * *